United States Patent [19]
Feller et al.

[11] 4,282,784
[45] Aug. 11, 1981

[54] METHOD AND LATHE FOR MACHINING OUT-OF-ROUND CIRCUMFERENCES

[75] Inventors: Otto Feller, Leichlingen; Heinz Oepen, Hückeswagen; Manfred Kühl, Leverkusen; Alois Skrobek; Horst Bornefeld, both of Burscheid; Hans G. Seiler, Odenthal; Walter Johann, Wermelskirchen, all of Fed. Rep. of Germany

[73] Assignee: Goetze AG, Burscheid, Fed. Rep. of Germany

[21] Appl. No.: 45,733

[22] Filed: Jun. 5, 1979

[30] Foreign Application Priority Data

Jun. 5, 1978 [DE] Fed. Rep. of Germany ....... 2824624

[51] Int. Cl.³ .................. B23B 3/28; B23B 3/00; B23B 19/02
[52] U.S. Cl. .................................. 82/19; 82/1 C; 82/2 B; 82/29 A
[58] Field of Search ............. 82/19, 28 R, 29 A

[56] References Cited

U.S. PATENT DOCUMENTS

| 1,465,068 | 8/1923 | Turner | 82/19 |
|---|---|---|---|
| 1,732,631 | 10/1929 | Bennett | 82/19 |
| 1,879,506 | 9/1932 | Roberts | 82/29 A |
| 2,060,437 | 11/1936 | Harley | 82/29 A X |
| 2,209,037 | 7/1940 | Riegger | 82/29 A |
| 2,437,603 | 3/1948 | Hornfeck | 82/29 A |
| 2,641,874 | 6/1953 | Kirby | 82/29 A |
| 2,846,638 | 8/1958 | Suel | 82/29 A |
| 3,040,607 | 6/1962 | Bulliet | 82/29 A X |
| 3,190,156 | 6/1965 | Schuman | 82/29 A |
| 3,744,353 | 7/1973 | Rohs | 82/28 R |

Primary Examiner—Harrison L. Hinson
Attorney, Agent, or Firm—Spencer & Kaye

[57] ABSTRACT

A method and apparatus for circumferentially machining an out-of-round workpiece in which the workpiece is rotated about its longitudinal axis at an irregular angular speed.

4 Claims, 6 Drawing Figures

METHOD AND LATHE FOR MACHINING OUT-OF-ROUND CIRCUMFERENCES

BACKGROUND OF THE INVENTION

This invention relates to a method for machining the peripheries of out-of-round workpieces and to a lathe for carrying out this method. The invention is especially useful in the machining of out-of-round raw piston rings with gap sections not yet cut out.

Lathe-like apparatus incorporating a copying device have been employed for the peripheral machining of piston rings having out-of-round inner and outer circumferences. In such apparatus, the piston rings are axially clamped together to form a stack and mounted on a driven spindle for simultaneous machining of their inner and outer circumferences. The tools are attached to the ends of pivotal tool holders provided with a radial adjustment that is controllable by a copying cam rotating in synchronism with the work spindle. In particular, an adjustable dual lever system may be used for controlling the tool for out-of-round machining of piston rings, such apparatus having been operated satisfactorily for many years.

A disadvantage of the prior art machining apparatus is that the maximum number of revolutions of the spindle depends upon the out-of-round shape of the piston ring. Specifically, in the area of the piston ring where the gap is cut after machining and where there is a relatively slight curvature, the copying lever system does not provide a reliable, accurate transfer of the out-of-round contour of the workspindle. This occurs because, with an increase in the number of revolutions in synchronism with the copying cam, the copying roller is lifted off the cam or the mass inertia of the copying lever system is insufficient to assure accurate transfer of the out-of-round contour.

Recently, cutting tools have been developed which permit very high cutting speed thereby permitting an increase in the output of the machining apparatus. This increase in the relative cutting speed between the tool and workpiece requires a simultaneous reduction of the cutting depth or advance in order to reduce mechanical and thermal stresses on the workpiece during the cutting process. Accordingly, it is now possible to reduce to a minumum the undesirable internal stresses which occur in the workpiece structure as a result of the machining process.

It is an object of the present invention to provide a method, and a lathe operating according to this method, which provides optimum cutting conditions during machining of the circumferences of out-of-round workpieces such as piston rings.

SUMMARY OF THE INVENTION

In accordance with the present invention, the piston ring during machining is rotated about its longitudinal axis at a variable or irregular angular speed. The amount of irregularity; i.e. the change in the angular speed per revolution of the workpiece, corresponds to the change in the out-of-round contour of the workpiece so as to obtain an increase in the average circumferential speed of the workpiece by reducing the radial acceleration peaks.

This may be explained as follows.

The circumferential speed of the workpiece namely the piston ring is generally higher than in the case of prior art apparatus. At least for machining the gap section of the piston ring, the circumferential speed is reduced only in this circumferential section to a lower range so that the working tool can exactly follow the very great change in the out-of-round contour in this section. After that, the angular speed of the spindle is accelerated to the prior range. It is to be understood that the average speed is higher than is employed in the prior art so that the optimum cutting conditions are almost reached by this speed varying method.

The present method can be used not only for the machining of out-of-round workpieces, such as piston rings and cam discs, but also for out-of-round shaping by means other than cutting, or during the spraying-on of surface coatings.

If a conventional lathe having a work spindle which accommodates the workpiece and at least one axially and/or radially adjustable tool is employed, the drive motor may be a reversible-pole three-phase motor. The number of revolutions of the rotor of such a motor may be changed by utilizing the inertial movement of the drive system of the lathe. The desired operation is obtained by periodically switching the motor to achieve alternating acceleration and braking thereby producing a fluctuation in the angular speed of the motor drive shaft which corresponds approximately to a sinusoidal oscillation.

In order to obtain relatively high irregular workspindle rotations, a d.c. servomotor may be used as the main drive with the motor being electronically controlled in both directions of rotation by a ramp function stored in a computer. The use of an electronically controllable stepping servomotor has the further advantage that the total number of revolutions of the spindle, as well as the change in the angular speed of the spindle per revolution, can be obtained directly without any intermediate gears. Preferably, the servomotor is disposed flush with the spindle and the armature shaft of the servomotor connected directly to the spindle so as to prevent relative rotation between the two members. Thus, masses which must be accelerated with every step of the motor and which are unavoidable when gear or belt drives are employed are not present in the system.

In many conventional lathes, the workspindle is driven by an electric or hydraulic motor via a belt drive. According to a further feature of the present invention, the control element which determines the angular speed of the spindle comprises an out-of-round belt pulley preferably in the form of an eccentric connected to the spindle. The degree of eccentricity of the belt pulley is a measure of the magnitude of the change in the angular speed of the spindle and thus of the circumferential dimensions of the out-of-round workpiece to be machined.

An energy storage device may also be provided in the drive system of a lathe of the above-described type for the partial storage and discharge of kinetic energy per revolution of the spindle. Such an energy storage device preferably includes a spring which can be tensioned by means of a cam plate that rotates together with the spindle. In addition, a pivot lever having a sensing roller is provided to tension a compression, tension or torsion spring. The influence of the irregular rotary movement of the spindle, which has a reactive effect on the drive motor, is reduced by providing a torsion spring connected to the drive shaft of the motor.

DESCRIPTION OF THE PREFERRED EMBODIMENTS

Figure 1:
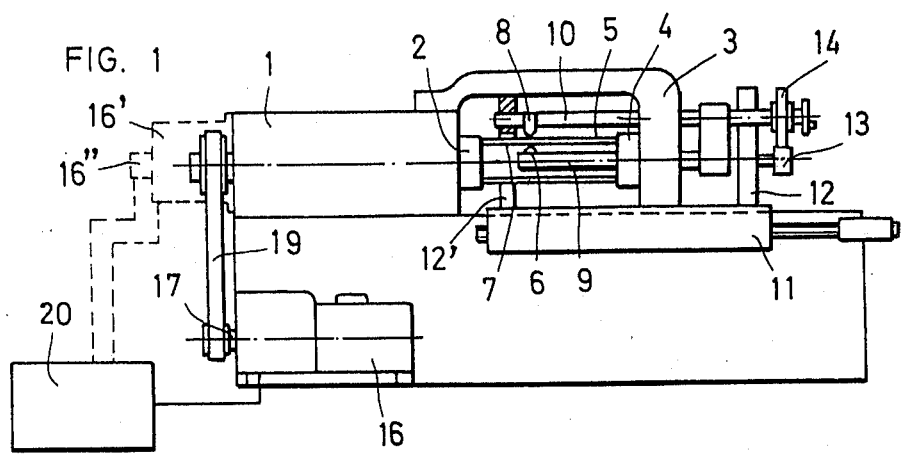
FIG. 1 is a front view of a lathe according to the invention which uses a d.c. servomotor as the main drive.

FIG. 1 is a schematic representation of a lathe for the simultaneous machining of the internal and external peripheral faces of out-of-round piston rings. The lathe includes a spindle stock 1 holding a sprindle 2 rotatably mounted therein and a counter yoke 3 supporting a rotatable socket 4 to which a piston ring stack 5 may be axially clamped. Tools 6 and 7, which are provided for the internal and external machining of the piston ring stack respectively, are connected to a pivotal rocker bar 10 by means of an arm 8 and an axial rod 9 respectively. The rocker bar 10 is mounted on two posts 12, 12' which are fastened to a longitudinal carriage 11. Additional details of the lathe are found in commonly-assigned copending application Ser. No. 924,732 filed July 14th, 1978 and are incorporated by reference herein.

The radial vibratory movements of tools 6 and 7 caused by the out-of-round circumferential contour of the piston ring are transferred to the rocker bar 10 by a copying cam 13 which rotates in synchronism with the spindle 2 via a lever 14 having a sensing roller. The drive for the spindle is a d.c. servomotor 16 whose armature shaft 17 is connected with the spindle 2 by a belt drive 19. The servomotor is controlled by an electronic computer 20 in which a ramp function has been stored.

In another embodiment of the invention, a servomotor 16' and an encoder 16" are mounted flush with the spindle as shown in dashed lines on FIG. 1. The encoder 16" monitors the angular position of the spindle and the direct mounting of servomotor 16' eliminates the additional elements in the belt drive which would have to be accelerated.

Figure 2:
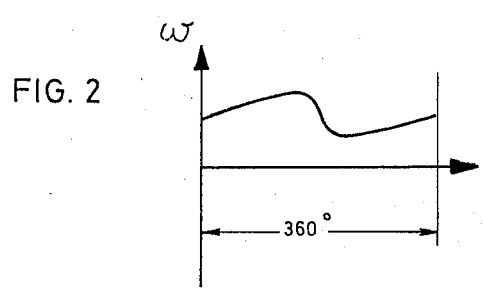
FIG. 2 is a plot of the angular speed of the workpiece in the lathe of FIG. 1 as a function of the angular displacement of the workpiece during one revolution thereof.

FIG. 2 shows a typical relationship between the angular speed $\omega$ of the workspindle 2 and the angular position $\theta$ of the workpiece for the lathe of FIG. 1.

Figure 3:
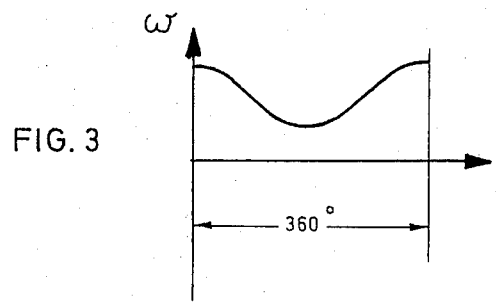
FIG. 3 is a plot of the angular speed of the workpiece in a lathe employing a reversible pole three-phase motor drive as a function of the angular displacement of the workpiece during one revolution thereof.

In another embodiment of the invention, a reversible pole three-phase motor is used as the drive for the spindle instead of the servomotor 16 or 16'. By alternatingly accelerating and braking the masses of the members comprising the drive system by means of the reversible pole three-phase motor, it is possible to produce degrees of irregularity in the angular speed $\omega$ of the drive shaft which vary approximately sinusoidally as a function of the angular position $\theta$ of the workpiece, as shown in FIG. 3, thereby assuring a sufficient approximation to various out-of-round shapes, particularly those of piston rings.

Figure 4:
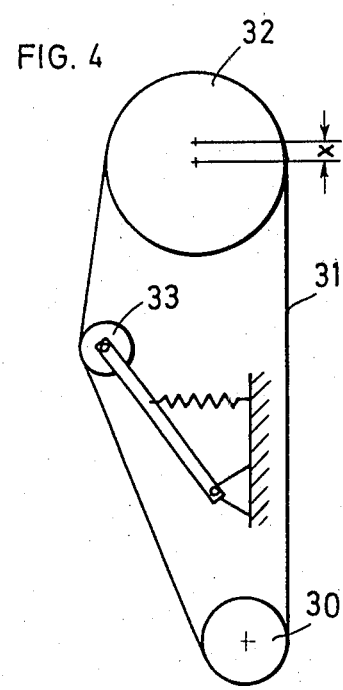
FIG. 4 is a side view of a lathe having an eccentrically rotating belt pulley.

FIG. 4 illustrates another embodiment of the invention employing a belt drive. A conventional three-phase motor drives a pulley 30 at a constant speed. Pulley 30 is connected to a cam disc 32, which is attached to the spindle of the lathe, by means of the belt 31. In order to produce an irregular rotary movement of the spindle, cam disc 32 is mounted eccentrically, the magnitude of the eccentricity x determining the change in the angular speed per revolution of the workspindle. A spring-tensioned pressure roller 33 is used to keep the belt tension uniform.

The amount of eccentricity x is determined as follows.

In case of machining raw piston rings, the eccentricity x is derived from the lowest and highest diameter of the raw piston ring with out-of-round contour. Thus, the speed of the spindle is changing sinusoidally between a maximum and a minimum, as shown in FIG. 3. The minimum should be reached in the moment before the working tool arrives at the piston ring gap because the greatest radial accelerations of the working tool are to be realized in the circumferential sections just before and behind the gap.

Figures 5, 6:
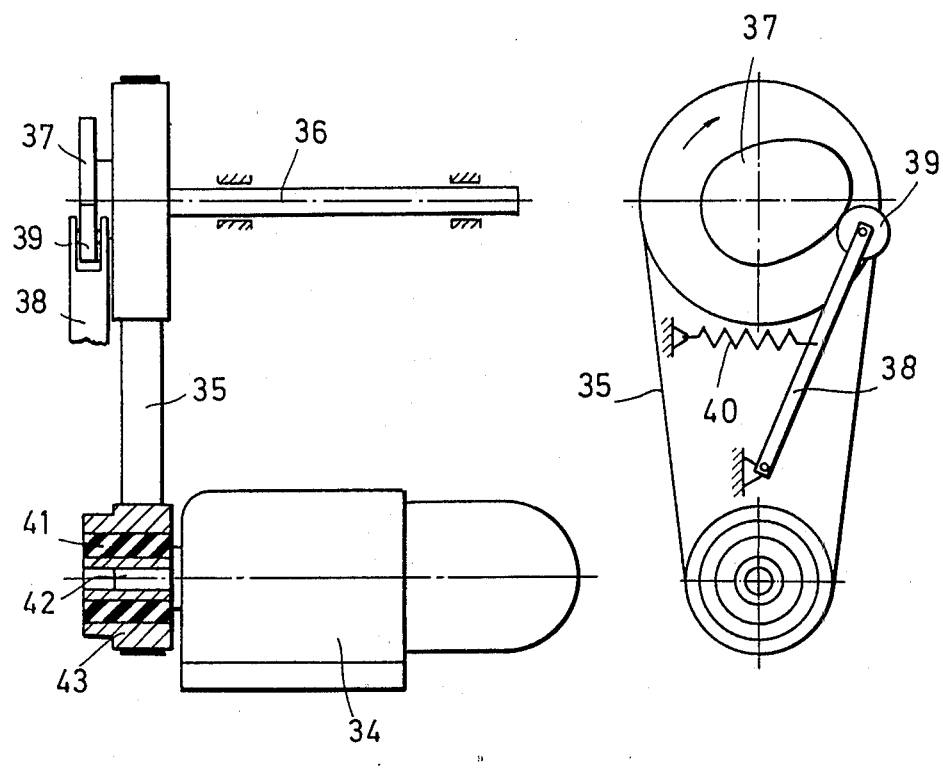
FIGS. 5 and 6 are front and side views of a lathe including an energy storage device.

FIGS. 5 and 6 show a drive system for a lathe according to a further embodiment of the invention wherein the uniform rotary movement generated by a main motor 34 is transmitted to a spindle 36 by means of a belt drive 35. A cam disc 37 fastened to the spindle periodically stretches and relaxes a tension spring 40 by means of a sensing roller 39 disposed at the end of a pivot lever 38 to alternately convert kinetic energy into potential spring-tensioning energy. As a result, the angular speed of spindle 36 is reduced when the spring 40 is tensioned and, as soon as the sensing roller 39 passes over the highest point on the cam disc, the then relaxing spring 40 causes the spindle to accelerate. Since the three-phase drive motor 34 runs at a substantially constant speed, a torsion spring 41 is provided on the drive shaft 42 within the cam disc 43 to produce torsion equalization.

By suitable selection of the system parameters (shape of the cam disc, spring constants and lever arrangement) and taking into account the inertial moments of the system, the degree of irregularity in the angular speed of the spindle is determined.

Basically the cam disc could be an eccentrically mounted disc with an angular periphery. For providing optimum cutting conditions during machining, the peripheral contour of the cam disc is to be found experimentally because the whole machine mechanism is individually to be considered.

It will be understood that the above description of the present invention is susceptible to various modifications, changes and adaptations, and the same are intended to be comprehended within the meaning and range of equivalents of the appended claims.

What is claimed is:

1. A lathe for circumferentially machining an out-of-round workpiece comprising
    a supporting structure,
    a spindle rotatably mounted on said supporting structure, said spindle receiving at least one workpiece, and
    a variable speed drive for rotating said workpiece at an irregular angular speed, said drive comprising a motor and energy storage means interposed between said motor and said spindle for partially storing and discharging kinetic energy during each revolution of said spindle.

2. A lathe as defined by claim 1 wherein said energy storage means comprises a cam disc secured to said spindle and a spring, said spring being placed under tension by said cam disc.

3. A lathe as defined by claim 2 wherein said energy storage means further comprises a pivot lever and a sensing roller rotatably attached to said pivot lever, said sensing roller rolling over said cam disc to tension said spring.

4. A lathe as defined by claim 3 wherein said energy storage means further comprises a torsion spring and a second cam disc, said torsion spring being positioned between the drive shaft of said motor and said second cam disc.

* * * * *